US007844659B2

(12) United States Patent
Baeuerle et al.

(10) Patent No.: US 7,844,659 B2
(45) Date of Patent: Nov. 30, 2010

(54) PROCESS INTEGRATION PERSISTENCY

(75) Inventors: Stefan Baeuerle, Malsch (DE); Guenter Pecht-Seibert, Muehlhausen (DE); Jan Teichmann, Neustadt/W. (DE); Andreas Brossler, Leingarten (DE)

(73) Assignee: SAP AG, Walldorf (DE)

( * ) Notice: Subject to any disclaimer, the term of this patent is extended or adjusted under 35 U.S.C. 154(b) by 360 days.

(21) Appl. No.: 11/395,377

(22) Filed: Apr. 3, 2006

(65) Prior Publication Data

US 2007/0233778 A1    Oct. 4, 2007

(51) Int. Cl.
*G06F 15/16* (2006.01)
(52) U.S. Cl. ............... 709/202; 709/201; 709/205; 719/315; 719/316; 719/317; 705/7; 707/792; 707/795; 717/102; 717/108; 717/120
(58) Field of Classification Search .......... 709/201, 709/202, 205; 717/108, 120, 102; 707/100, 707/200, 103, 792, 795; 719/315–317; 705/7
See application file for complete search history.

(56) References Cited

U.S. PATENT DOCUMENTS

| 6,298,478 | B1 * | 10/2001 | Nally et al. ............... 717/170 |
| 6,643,652 | B2 * | 11/2003 | Helgeson et al. ............ 707/10 |
| 6,917,930 | B1 * | 7/2005 | Brodale et al. ............... 707/2 |
| 7,089,583 | B2 * | 8/2006 | Mehra et al. ................. 726/3 |
| 7,240,327 | B2 * | 7/2007 | Singh et al. ............... 717/108 |
| 7,590,640 | B2 * | 9/2009 | Wolber et al. ............. 707/100 |
| 2002/0188486 | A1 * | 12/2002 | Gil et al. ..................... 705/7 |

* cited by examiner

*Primary Examiner*—Nathan Flynn
*Assistant Examiner*—Mohammad A Siddiqi
(74) *Attorney, Agent, or Firm*—Kenyon & Kenyon LLP

(57) ABSTRACT

The addition of a datastore to an application system using process agents for communication allows for maintaining a persistent state by storing records of messages sent between process agents. These records may be retrievable by process agents in order to determine the state of the system. This allows process agents to update previous transactions without storing a copy of messages within each process agent or communicating with every potentially involved process agent to determine its current state.

6 Claims, 4 Drawing Sheets

PROCESS INTEGRATION PERSISTENCY

BACKGROUND

Large software applications are often composed of unmanageably large amounts of executable code. In order to facilitate creation and management of large software systems, then, the systems are often composed of many different components, called business objects. Business objects are software components that encompass user interfaces, data, business rules, communication components and any other code that may relate to their function.

In order to simplify design of these large systems, business objects are often defined as collections of logically related functions and data. A large application designed to facilitate a typical mail order business may have many different business objects. An ordering business object may be used to handle incoming orders or changes to existing orders. A shipping business object may be implemented to handle all shipping related tasks, such as arranging for deliveries or determining shipping times and costs. Business objects may handle some tasks independently while communicating with other business objects to complete other tasks. Business objects may also be grouped into larger components, called deployment units (DUs), that represent related groupings of business objects. As billing and ordering are often tightly related, they may be placed in a single DU. Customer databases and employee payroll, however, are not related at all and thus would usually be placed in separate DUs. DUs may then be deployed to systems as independent units, sharing a single computing device or spanning many such devices connected over a variety of networks.

This design model suffers from several problems however. First, storing many different components all in one business object may make its operation slower. Whenever one part of the business object is acting, the others may be suspended until that action is complete. Thus, if one business object communicates with another business object in order to perform a coordinated action, both business objects could be locked until that operation is complete. Users would be unable to use the objects, nor would other business objects be able to communicate with them, until the operations were completed.

When integrating business objects together, a user encounters another severe deficiency of the present system. A business object cannot be designed to coordinate with every imaginable other business object, and thus some changes will have to be made to one or both of the newly integrated business objects in order to coordinate their operations. As discussed above, this leads to a shutdown and upgrade of at least one of the business objects, as well as a review of the entire inner working of the business objects in order to learn which components within them must be changed.

Accordingly, there is a need in the art for a system that uses separate objects, called process agents, to integrate business objects and a data store to maintain persistency in the application system.

DETAILED DESCRIPTION

The process agents mentioned in the background are also discussed in the related application Ser. No. 11/319,514 (filed Dec. 29, 2005). Process agents are software components act as intermediaries between business objects, each handling observation of a single business object and notification to another process agent of any changes that must be conveyed to another business object. By removing those functions from the business objects and placing them in associated, separate objects, business objects no longer act as obstacles to integration and updating of application systems. These business objects and process agents may still be placed in deployment units (DUs) as discussed in the background. The use of process agents, however, may result in problems with maintaining persistence in the application system. For example, a business object may store its data in a persistent manner so that, even when the system is not operating the data is not lost. Process agents do not store the messages they have sent or received, however, and thus they do not maintain any state or information from moment to moment. Thus, when a process agent receives notification that an update to an order has been received, it may not know the status of that order nor which business objects to notify of the update. Furthermore, a process agent may need to examine messages sent between other business objects, having never seen those messages in the first place. These problems may be solved by use of a process integration persistency datastore.

Figure 1:
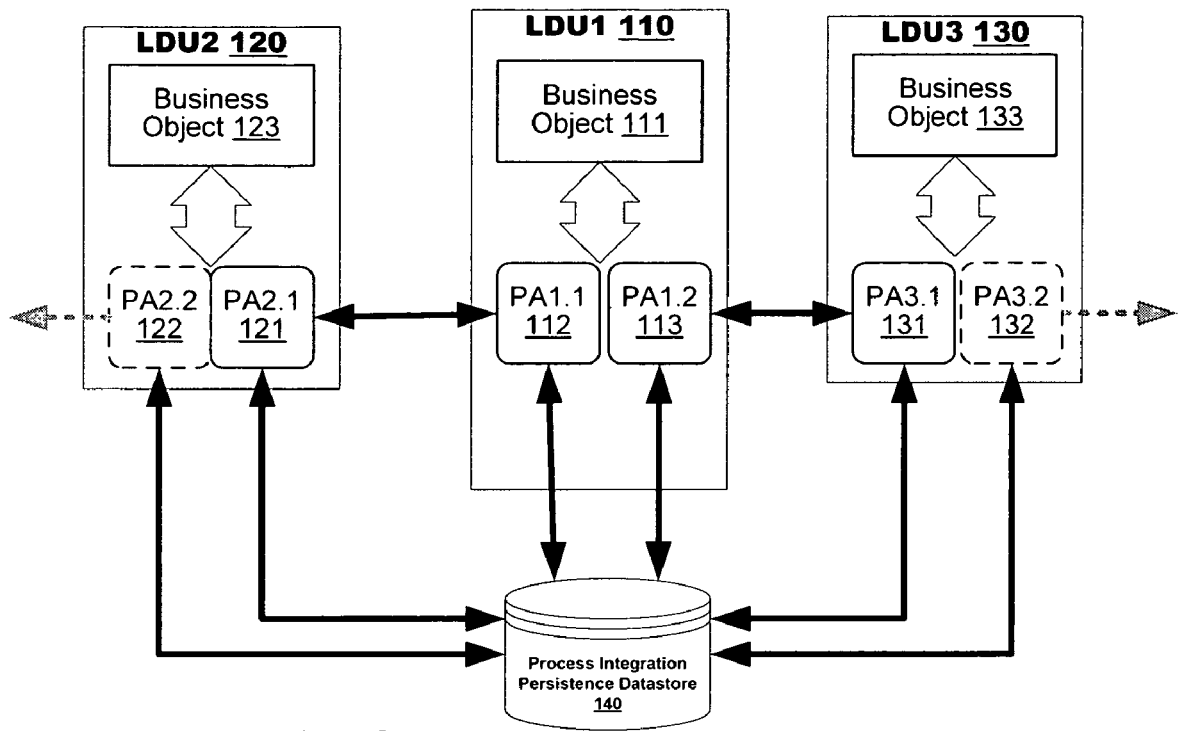
FIG. 1 shows an application system containing several logical deployment units, business objects, process agents, and a process integration persistence datastore according to an embodiment of the invention.

FIG. 1 shows a simplified block diagram of an application system consisting of business objects integrated through process agents, using a process integration persistence datastore. The application system of FIG. 1 shows three different logical deployment units (DUs), DU1 110, DU2 120 and DU3 130. In an example system, these DUs could each represent departments of a business or different functional groups within a company, such as customer relationships, billing, inventory, human resources and accounting. An application system may have any number of DUs, but for simplicity this example shows only three DUs. Each DU contains any number of business objects (again for simplicity, only one business object is shown for each DU in this example). Business objects often represent closely related data and business logic. Within an DU representing the billing department, for example, one might find a business object for invoicing, another for handling the processing of charges and another for generating packaging instructions for shipping. Thus, while a business object represents data that is closely related, an DU represents a set of business objects that are related at a higher level. Though business objects represent closely related data, they communicate with certain related business objects due to dependencies between the data represented in the different business objects. In order to communicate with other business objects, each business object is associated with a set of process agents.

In one embodiment, all communications between business objects pass through two process agents. A first process agent creates and sends a message relating to its own business object; this message is received by a second process agent associated with the receiver business object. The receiving process agent then handles tasks relevant to the receiver business object based on the message from the first process agent. In FIG. 1, for example, Business Object 111 is associated with process agents PA1.1 112 and PA1.2 113. Each of these process agents communicates with an associated process agent regarding the relationship between Business Object 111 and another business object. In FIG. 1, for example, Business Object 111 is associated with process agent PA1.1 112, which is in turn associated with process agent PA2.1 121 within DU2 120. Process agent PA2.1 121 is associated with a business object within DU2 120, Business Object 123. Process agents PA1.1 112 and PA2.1 121 handle any communication that must take place between Business Object 111 and Business Object 123. Process agent PA1.2 113 handles communication between Business Object 111 and Business Object 133 (through process agent PA3.1 131) in the same manner. Each of these other business objects has its own set of process agents; for simplicity, only two process agents are shown for each of these business objects. In FIG. 1, Business Object 123 is thus associated with two process agents, PA2.1 121 and PA2.2 122. While PA2.1 121 is used for communications between Business Object 123 and Business Object 111, as described above, PA2.2 122 is used for communication between Business Object 123 and some other business object not shown. Business Object 133 is similarly associated with two process agents, PA3.1 131 and PA3.2 132. PA2.1 131 is used for communications between Business Object 133 and Business Object 111, as described above, and PA2.2 132 is used for communication between Business Object 133 and some other business object not shown.

When process agents communicate, they do not retain any internal record of previous communications. Thus, updating an existing order could prove difficult without numerous messages to other business objects. For example, if a customer has already placed an order for goods and wishes to change one quantity of an item in that order, process agents within the ordering DU must coordinate the change with shipping (to ensure that the order is modified before it is sent) and billing (to ensure that the bill accurately reflects the new quantity of items ordered). If the order has already shipped, a message may be sent from the shipping DU to the ordering DU to inform it that no update can be made. Unfortunately, this message is passed to the process agent within the ordering DU that handles only ordering-shipping messages; this process agent is unable to notify the billing DU that the update should not be processed. For this reason, the system also includes one Process Integration Persistence Datastore (PIPD) 140. The PIPD 140 can be implemented in many different ways in various embodiments. For example, the PIPD 140 may be a commercial database product, a flat data file or any other appropriate storage medium. The PIPD 140 may store a record of messages that are sent between process agents on a system. In some embodiments, there may be several PIPDs; each could retain a complete copy of all messages or each could retain merely an abbreviated record of only a set of messages (such as all messages to or from a certain DU, for example). In some embodiments, such as the embodiment shown in FIG. 1, there is a single PIPD 140 that handles all messages between all DUs. The messages are sent to the PIPD 140 by the process agents PA1.1 112, PA1.2 113, PA2.1 121, PA2.2 122, PA3.1 131, PA3.2 132 and any other process agents, not shown, that operate within the system. The PIPD 140 may also retrieve message records for process agents, sometimes in response to a request for messages sent by the process agents. In the order update example discussed above, then, the ordering process agents could each request copies of messages regarding the order from the PIPD 140; each ordering process agent would then know whether the order could be updated. This enables the system to operate quickly, without needless messages between numerous process agent or slower messages to other DUs that may exist on different machines. As two DUs may be on separate computing devices and may even be separated by slow network components, these inter-DU communications may be incredibly slow. Thus, using PIPD 140 allows much faster operation.

Figure 2:
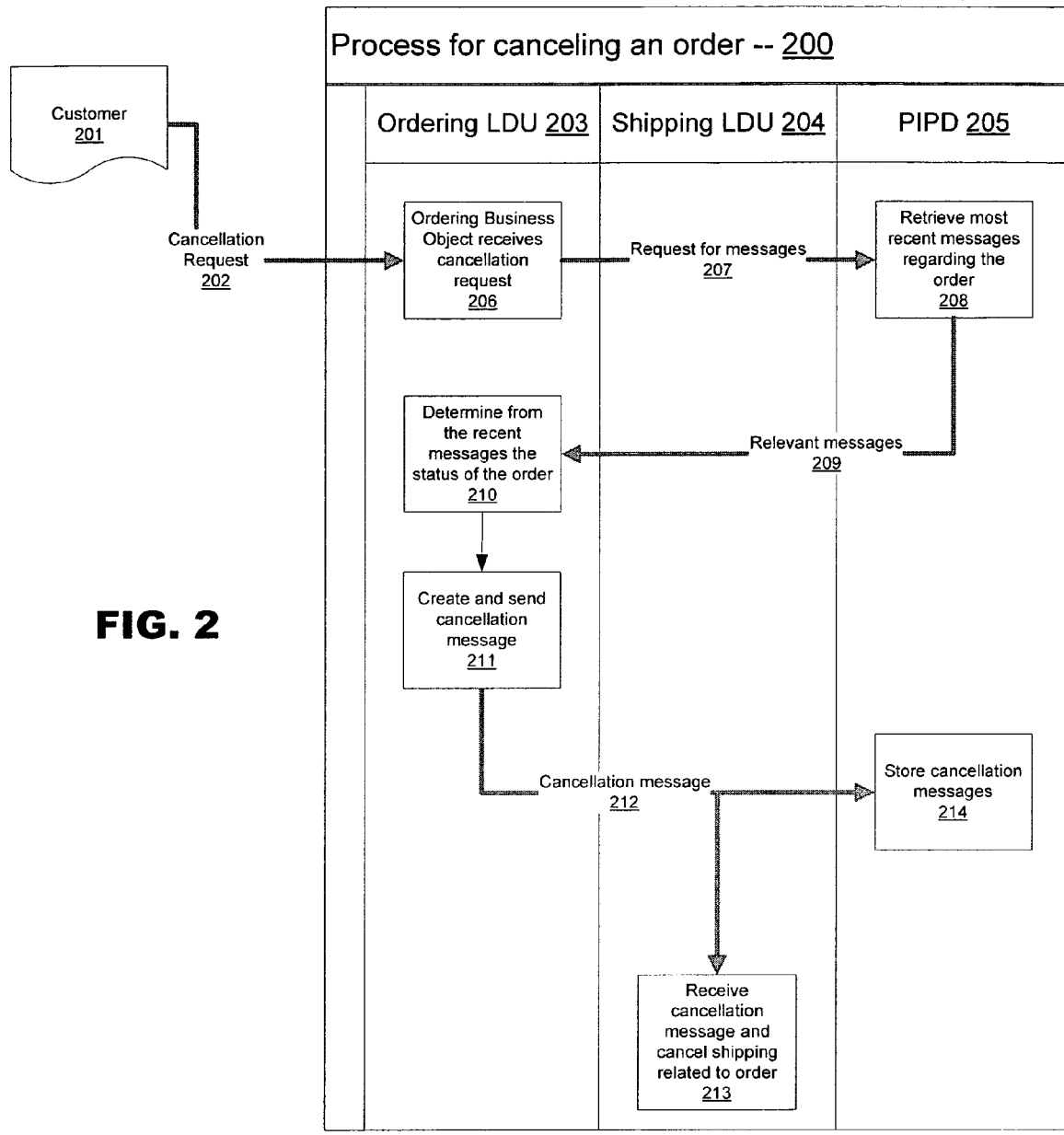
FIG. 2 shows an example process flow diagram depicting the steps that may be taken to cancel a product order in a retail sales system according to an embodiment of the invention.

Depicted in FIG. 2 is an example of how the Process Integration Persistency Datastore (PIPD) functions in an embodiment. FIG. 2 shows the communications and steps involved when a customer 201, having previously placed an order for goods into the system, wishes to cancel that order. For demonstrative purposes, this example uses two DUs; in reality all communication could also occur between process agents associated with business objects within the same DU. Though messages are depicted as sent or received by DUs, in the preferred embodiment the messages are sent and received by process agents within the respective DUs; for simplicity only the DUs are shown. Customer 201 may send a cancellation request 202 to the ordering DU 203. The ordering DU 203 may then receive the cancellation request 202 at processing block 206. In order to cancel the order, the ordering DU 203 may determine the current status of the order, including all steps taken to fulfill the order by other DUs. Thus, after the cancellation request is received, the ordering DU 203 may generate and send a request for messages relating to the relevant order 207 to the PIPD 205. The PIPD 205 may maintain a store of records of messages that have been sent between business objects within the same DU or across different DUs. At processing block 208, the PIPD 205 may retrieve from its store of records the most recent records related to the order. In some embodiments, the PIPD 205 may retrieve all records related to the order. In some embodiments, the PIPD 205 may retrieve records determined by different criteria, based on the business object that requests them. Once the messages are retrieved, the PIPD 205 may deliver the retrieved records 209 to the ordering DU 203. The ordering DU 203 must then determine the status of the order based on the retrieved records 209 retrieved from the PIPD 205 at processing block 210. These retrieved records 209 may indicate which business objects have received the order and taken action to fulfill it. Using this information, the ordering DU 203 may determine which other DUs and business objects require notification of the cancellation.

At processing block 211, the ordering DU 203 may send a cancellation message 212 to the shipping DU 204. As discussed above, FIG. 2 shows a simple example embodiment; in other embodiments, the cancellation message may be sent to any other DU or business objects that should be notified of a cancellation order. Thus, in another embodiment, separate cancellation messages may be sent to a shipping DU (to prevent a cancelled order from shipping), a billing DU (to cancel a pending charge to the customer, to credit an already-charged customer, etc.) and any other DU or business object that should be notified. The cancellation message may contain any information, but should at least convey sufficient information to allow the destination DU or business object to perform any necessary tasks. In the example depicted in FIG. 2, the cancellation message 212 may contain a shipping identifier, an order identifier, a customer identifier, other information regarding the order or the customer, or any combination thereof. At processing block 213, the Shipping DU 204 receives the message and cancels any shipping activities related to the now cancelled order. In some embodiments, the cancellation message 212 is also stored in the PIPD 205 at processing block 214.

Figure 3:
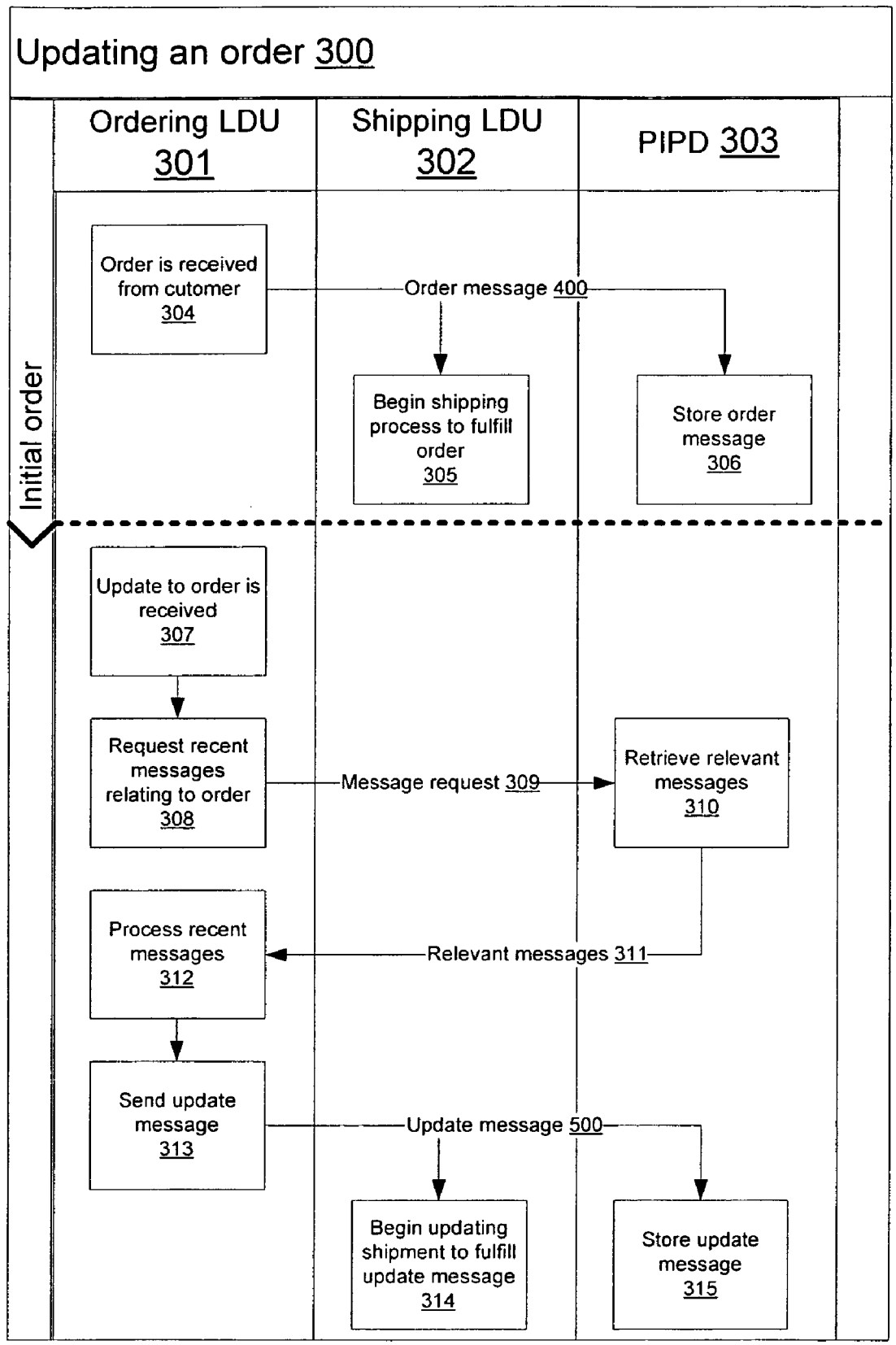
FIG. 3 shows an example process flow diagram depicting the steps that may be taken to update a product order in a retail sales system according to an embodiment of the invention.
Figure 4:
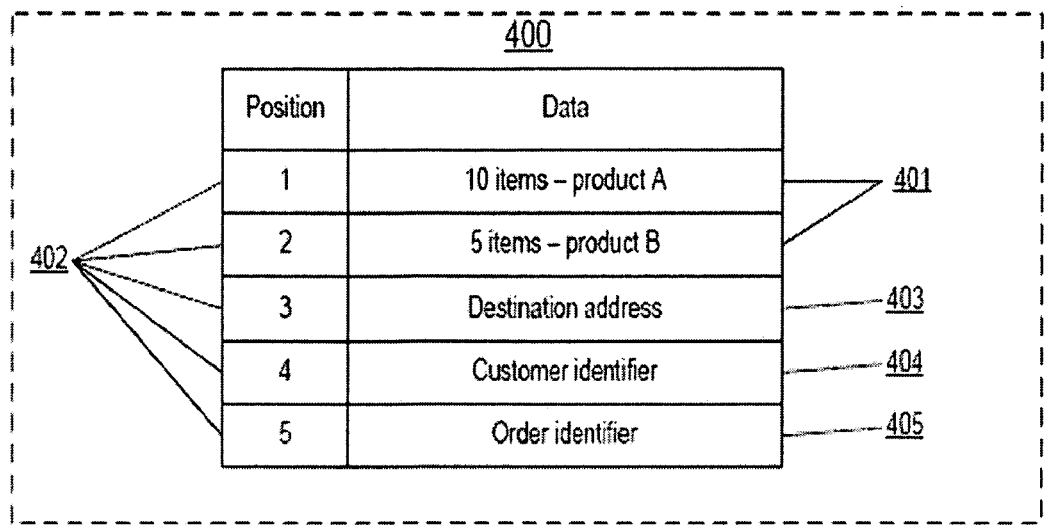
FIG. 4 shows an example product order message that might be sent between process agents according to an embodiment of the invention.
Figure 5:
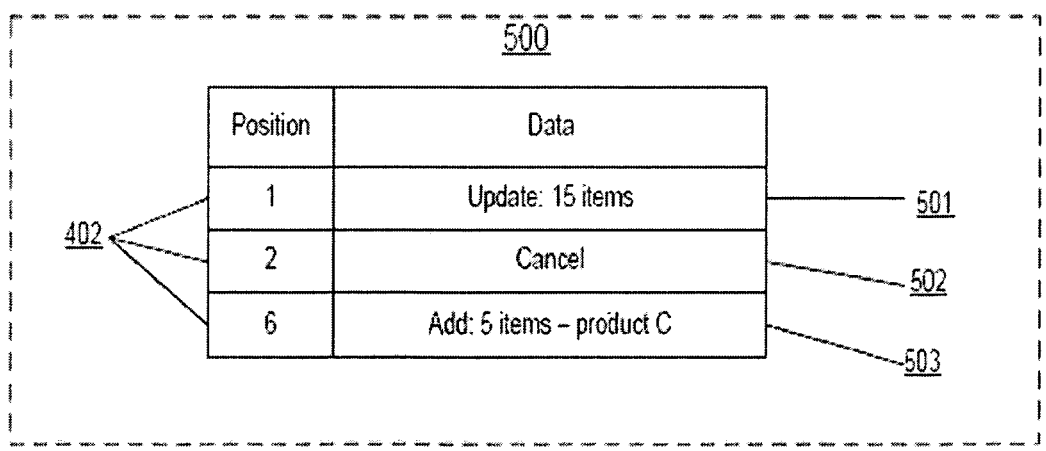
FIG. 5 shows an example product order update message that might be sent between process agents according to an embodiment of the invention.

FIG. 3 shows another example of how the PIPD functions in one embodiment. The example shown in FIG. 3 demonstrates the process followed when a customer places an order and subsequently changes the order. When an order is received by the ordering DU 301 at processing block 304, an order message 400 is created (the structure of the order message 400 is depicted in FIG. 4 and explained below). The order message 400 may contain information regarding an order, such as item descriptions, quantities, prices, customer information, etc. An order message 400 is sent to the shipping DU 302 in order to initiate the shipping process at processing block 305. An order message 400 is also sent to the PIPD 303 for storage at processing block 306. At a later time, the customer may wish to change the order to reflect different items or quantities for purchase. A request to update the order may then be sent to the ordering DU 301, either by the customer directly (using an internet-accessible user interface, for example) or indirectly (through the customer's own systems, which are connected to the ordering DU 301 by some network, for example). When the ordering DU 301 receives a request to update the order at processing block 307, it must first determine the status of the order. In order to send appropriate messages to other DUs or to the customer, the ordering DU 301 must first determine what actions have already taken place. If the order has already been shipped, it may be too late for the customer to update the order, for example. The changes made to a billing procedure may be different depending on whether the customer has not yet been billed (possibly requiring only a updated bill be sent to the customer) or has been billed and has paid (possibly requiring a refund or an additional bill and explanation be generated). In order to determine the status of the order, the ordering DU 301 sends a message request 309 to the PIPD 303. The message request 309 identifies the subject of the request (in this case, an order number may suffice, or a customer number and a temporal identifier). The PIPD 309 receives the message request 309 and, in processing block 310, retrieves the records that are relevant to the request. In some embodiments, this may entail retrieving only the most recent records regarding the order in question; in some other embodiments it may entail retrieving all records regarding the customer who placed the order. The criteria for determining which records are relevant may be specified differently for each system. The relevant records 311 are then sent to the ordering DU 301. Once the ordering DU 301 receives the relevant records 311, it processes them at processing block 312. This processing is required that the ordering DU 301 may sent update messages, discussed below, to all appropriate business objects and DUs. The ordering DU 301 may then compose an update message 500 (FIG. 5) at processing block 316. A sample update message 500 is shown in FIG. 5 and is discussed below. The update message 500 may be sent to any DU that requires an update, such as the shipping DU 302 in this example. When the shipping DU 302 receives the update message 500 at processing block 314, it may update the shipping process that was initiated in processing block 305. This updating of the shipping process may include generating reports to indicate the changes that must be made or any other steps necessary to ensure that the order is modified to reflect the contents of update message 500. A copy of the update message 500 may also be sent to the PIPD 303 for storage at processing block 315. A later update process might receive this copy of the update message 500 as one of the relevant messages 311 retrieved in processing block 310. Thus, any request to update an order would receive the original order and all updates that have occurred since.

FIG. 4 depicts an order message 400 from one embodiment of the invention. The order message 400 may be composed of a series of item descriptions 401. The item description 401 may describe a quantity of an item, a name of an item, an item identifier (such as a product code), or any combination of information that is helpful in communicating the object of an order from a customer to another business object or DU. Each item description 401 may have an associated position number 402 that is unique within the order message. The order message 400 may also contain a destination address 403, a customer identifier 404, an order identifier 405 or any other information. The order message 400 shown in FIG. 4 is only an example from one embodiment of the invention serving as illustration, order messages and any other messages within the system may be created according to any number of different designs.

The order message 400 may be composed of item descriptions 401 that contain different information in different contexts. In an order message 400 destined for a business object that handles shipping, for example, the item descriptions 401 may contain product codes, quantities of each product code and a destination address 403. A business object that handles inventory quantities, however, may contain only item descriptions 401 of quantities and product codes with no accompanying destination address 403, as inventory management does not require information regarding the destination of outgoing inventory.

FIG. 5 shows an example update message 500 from one embodiment of the present invention. This update message 500 is only an example for illustrative purposes and should not be considered a limitation on the present invention. Other embodiments of the invention may feature update messages or other messages that are completely different in structure or function than those depicted in the present application. Update message 500 may contain any number of update commands 501, each associated with a position number 402. The update command 501 represents an update request that changes an aspect of a previous order message 400, update message 500 or any other message. Each update command represents a change to a single item description 401 from a previous message, the position number 402 serving as a common identifier between the two. For this reason, the PIPD 140 (FIG. 1) maintains copies of order messages 400 and delivers them to business objects that must create update messages 500 (or other messages). In FIGS. 4 and 5, for example, the position number 1 represents at first an order for 10 items of product A (in FIG. 4) and then a subsequent change to that order, requesting 15 items of that product number in FIG. 5.

Update message 500 may also contain any number of cancellation commands 502. A cancellation command 502 is equivalent to an update command that changes a quantity to zero. Cancellation commands 502 are related to item descriptions 401 through identical position numbers 402, as for update commands 501. In FIGS. 4 and 5, then, position number 2 first represents an order of 5 items of product B (in FIG. 4) and subsequently represents a cancellation of the order of that item (in FIG. 5).

Update message 500 may also contain any number of add-to-order commands 503. An add-to-order command 503 represents a request to add a new set of items to a previously made order, where the requested items are of a type not present on the previous order. While an update command 501 may reference an extant item description 401 through a common position number 402, the add-to-order command 503 must include a new position number 402. In FIG. 5 position number 3 represents an order of 5 items of product C that was absent from the order message 400 in FIG. 4. A subsequent update message 500 that modified the number of items requested of product C would require the new position number 402. The PIPD 140 may maintain copies of update messages for this reason.

Though many of the above descriptions detailed the message recording and retrieval procedure as occurring solely within a single PIPD, these functions may be located within one or several different components. For example, message recording could be handled within individual business objects. Alternatively, a PIPD component might store all message records for each DU, monitoring all business object and process agent communication within that DU. The functions could also be split amongst several objects in a DU, with separate PIPD components each handling a particular set of message records. Nothing in the claimed method need be restricted to any particular set of components. Nothing in this description of the present invention should be construed to limit the methods to a particular embodiment depicted or described.

What is claimed is:

1. A computer-supported business management method to be performed by a process agent, executed by a computing device, provided in and associated with one of a plurality of business objects, each business object having a separate process agent, executed by a computing device, assigned to communicate with each of the other business objects, the method comprising:

responsive to a request to update an order received by a first business object associated with a first process agent, executed by a computing device:

retrieving, by the first process agent from a process integration persistency database communicatively coupled to the process agent a set of messages relating to the order;

determining, by the first business object, which business objects need to receive notice of the request to update the order based upon the received set of messages relating to the order;

creating, by the first business object, an update message relating to the order based on the retrieved set of messages;

transmitting, by a corresponding process agent, executed by a computing device, associated with the first business object, the update message to a corresponding process agent, executed by a computing device, in each of the business objects determined to need to receive notice of the request to update the order; and transmitting, by the first process agent, the update message to the process integration persistency database, the process integration persistency database to store the update message;

wherein the business objects are stored persistently in a system, a business object comprising a set of logically related functions and data, the business objects to manage operations of the system, and the process agents manage communication between the business objects in a stateless manner;

wherein at least one of the received and retrieved messages is stored only outside any process agent; and wherein all communications between business objects pass through two process agents.

2. The method of claim 1, wherein the retrieved set of messages includes at least one message that the process integration persistency database had received from one of the process agents, executed by a computing device.

3. The method of claim 1, wherein the update message comprises an update command which is associated with a specified position number in the update message.

4. A computer-supported business management system, comprising:

a plurality of business objects to manage operations of the system, a business object comprising a set of logically related functions and data, the business objects stored persistently in the system;

a plurality of process agents, executed by a computing device, in and associated with respective business objects, each business object having a separate process agent, executed by a computing device, designated to communicated with each other business object; and a process integration persistency database coupled to the plurality of process agents, executed by a computing device, the process agents managing communication between the business objects in a stateless manner, wherein, responsive to a request to update an order received by a first process agent, executed by a computing device:

the first process agent:

retrieves, from the process integration persistency database, a set of messages relating to the order, determines, based upon the received set of messages, which business objects need to receive notice of the request to update the order, and creates, based on the retrieved set of messages, an update message relating to the order; and a corresponding process agent, executed by a computing device, transmits the update message to a process agent, executed by a computing device, associated with each business object determined to need notice of the request to update the order; and the first process agent transmits the update message to the process integration persistency database, the process integration persistency database to store the update message wherein at least one of the received and retrieved messages is stored only outside any process agent; and wherein all communications between business objects pass through two process agents.

5. The system of claim 4, wherein the retrieved set of messages includes at least one message that the process integration persistency database had received from one of the process agents, executed by a computing device.

6. The system of claim 4, wherein the update message comprises an update command which is associated with a specified position number in the update message.

* * * * *